United States Patent [19]
Nakajima

[11] Patent Number: 5,420,548
[45] Date of Patent: May 30, 1995

[54] QUARTZ CRYSTAL OSCILLATOR ANGULAR VELOCITY DETECTOR CIRCUITS

[75] Inventor: Fumio Nakajima, Tanashi, Japan

[73] Assignee: Citizen Watch Co., Ltd., Tokyo, Japan

[21] Appl. No.: 256,443

[22] Filed: Jul. 12, 1994

[30] Foreign Application Priority Data

Nov. 17, 1992 [JP] Japan .................. 4-329928
Aug. 27, 1993 [JP] Japan .................. 5-235514
Sep. 17, 1993 [JP] Japan .................. 5-253604

[51] Int. Cl.6 .......................................... G01P 15/09
[52] U.S. Cl. ........................... 331/65; 73/505; 73/517 AV; 73/517 A; 310/366; 310/370; 331/156; 331/163
[58] Field of Search ............. 331/65, 116 R, 116 FE, 331/158, 163, 156; 73/505, 517 AV, 517 A; 310/360, 366, 370

[56] References Cited

U.S. PATENT DOCUMENTS

| | | | |
|---|---|---|---|
| 4,674,331 | 6/1987 | Watson | 73/505 |
| 4,930,351 | 6/1990 | Macy et al. | 73/505 |
| 5,270,607 | 12/1993 | Terajima | 73/505 X |
| 5,293,779 | 3/1994 | Nakamura et al. | 73/505 |
| 5,349,857 | 9/1994 | Kasanami et al. | 73/505 |

FOREIGN PATENT DOCUMENTS

| | | |
|---|---|---|
| 0503807 | 9/1992 | European Pat. Off. |
| 61-191917 | 8/1986 | Japan . |
| 62-106315 | 5/1987 | Japan . |
| 3-172714 | 7/1991 | Japan . |
| 4-102013 | 4/1992 | Japan . |
| 4-118515 | 4/1992 | Japan . |

OTHER PUBLICATIONS

Patent Abstracts of Japan, vol. 10, No. 250 (P-491), Aug. 28, 1986.
Patent Abstracts of Japan, vol. 10, No. 305 (P-507), Oct. 17, 1986.
Patent Abstracts of Japan, vol. 17, No. 109 (P-1497), Mar. 5, 1993.
Patent Abstracts of Japan, vol. 11, No. 87 (P-557), Mar. 17, 1987.

*Primary Examiner*—Siegfried H. Grimm
*Attorney, Agent, or Firm*—Kanesaka & Takeuchi

[57] ABSTRACT

An angular velocity detector circuit composed of: an oscillator circuit including an inverting amplifier connected between a driving electrode of a quartz crystal and an electrode for detecting an electric field generated in the quartz crystal by a Corioli's force when the quartz crystal is rotated; a differential amplifier circuit connected at its input terminals to the detecting electrode of the quartz crystal; a detector circuit which receives the output from the differential amplifier circuit and using the output from the oscillator circuit as detection signals; and an output amplifier circuit which receives the output from the detector circuit.

6 Claims, 19 Drawing Sheets

QUARTZ CRYSTAL OSCILLATOR ANGULAR VELOCITY DETECTOR CIRCUITS

BACKGROUND OF THE INVENTION

1. Field of the Invention

The present invention relates to a circuit for detecting a rotation angular velocity using an angular velocity sensor comprising an oscillator, and, more particularly, to a circuit for detecting a rotation angular velocity which can provide highly accurate measurements and is adapted to mass production.

2. Background Technology

Mechanical rotation-type gyroscopes have been conventionally used as an instrument for inertia navigation of airplanes and ships. Although these gyroscopes exhibit stable performances, they are large and expensive. It is difficult to fabricate them into small-type equipment.

The use of oscillator-type angular velocity sensors which detect Corioli's force from a detecting element on a vibrating object is being developed in recent years. In these sensors the mass of a gyroscope is vibrated at a specific frequency. When a rotation force is applied to the mass, a Corioli's force at the same frequency is created to the direction perpendicular to the vibration of the mass. The principle of the oscillator-type angular velocity sensor consists of measuring the mass vibration of this force for the determination of the angular velocity.

A circuit for detecting an angular velocity using an angular velocity sensor based on this principle is disclosed, for example, in Japanese Patent Application Laid-open (kokai) 172711/1991. The oscillator disclosed in this patent application is a coupling oscillator of a tuning-fork structure which comprises vibrator units, each consisting of a driving section and a detection section joined perpendicularly to each other, and coupling blocks connecting these vibrator units.

Conventionally, elastic-invariable metals, such as Elinvar, or PZT-type piezoelectric ceramics have been used as oscillators. In the case of oscillators using an elastic-invariable metal, electrodes are formed on the metal surface, a thin piezoelectric element is adhered to the electrodes, then electrodes are again formed on the piezoelectric element.

An oscillator circuit for vibrating an oscillator principally consists of an amplifier and a feedback circuit. The following formulas (1) and (2) apply to the vibration conditions of the circuit, $$|\alpha| \cdot |\beta| > 1 \quad (1)$$

$$\theta 1 + \theta 2 = 360° \quad (2)$$

wherein $\alpha$ is the amplification factor of the amplifier, $\theta 1$ is the transmission rate of the feedback circuit, $\beta$ is the transmission rate of the feedback circuit, and $\theta 2$ is a phase lag. In order to satisfy the condition of the formula (2) conventional vibrator circuits for angular velocity circuits take a system of acquiring the phase lag of 360° for one loop by a phase lag of 180° at the amplifier, a phase lag of 90° by a phase shift circuit comprising a combination of resistors and capacities, and another phase lag of 90° by a resistor and the capacity of the piezoelectric element itself.

Conventional angular velocity detector circuits thus not only require a phase shift circuit, but also they must create a phase shift by a resistor and the capacity of the piezoelectric element itself. Because of this, the transmission rate $\beta$ of the feedback circuit and the phase lag $\theta 2$ may vary due to changes in the constant of the phase shift circuit which is caused by temperature changes, resulting in instability of the vibration. In addition, when a rotation force is applied, vibration produced by a Corioli's force in the oscillator is rendered unstable. This results in production of drift in the detector circuit output, leading to inaccuracy in the determination.

Furthermore, a decrease in the transmission rate $\beta$ in the feedback circuit caused by the resistance of the phase shift circuit requires an increased amplification factor $\alpha$ for the amplifier or provision of two or more amplifiers. Further, in order to stabilize the vibration by maintaining the transmission rate $\beta$ of the feedback circuit constant, a standard voltage generation circuit must be provided. This makes the detector circuit complicated.

The present invention has been achieved in order to solve these problems, and has an object of providing a circuit for detecting a rotation angular velocity, which is equipped with an oscillator circuit having a simple structure and capable of creating vibrations in a highly stable manner, and which provides high accuracy measurements and is adapted to mass production.

DISCLOSURE OF THE INVENTION

In one embodiment, the circuit for detection of angular velocity according to the present invention comprises a quartz crystal oscillator which is provided with a first electrode for driving the oscillator and a second electrode installed perpendicularly to the first electrode for taking out an electric field generated by rotation of the oscillator; an oscillator circuit having an inverting amplifier with the input terminal connected to the first electrode and the output terminal connected to the second electrode of the quartz crystal oscillator; a differential amplifier circuit with the input terminal connected to the second electrode of the quartz crystal oscillator; a detector circuit which receives the output from the differential amplifier circuit and using the output from the oscillator circuit as detection signals; and an output amplifier circuit which receives the output from the detector circuit.

In another embodiment of the present invention, the circuit for detection of angular velocity comprises a quartz crystal oscillator which is provided with a first electrode installed on two parallel planes of the oscillator for driving the oscillator and a second electrode installed perpendicularly to the first electrode for taking out an electric field generated by rotation of the oscillator; an oscillator circuit having an inverting amplifier with the input terminal connected to a portion of the first electrode and the output terminal connected to the other portion of the first electrode of the quartz crystal oscillator; a differential amplifier circuit with the input terminal connected to the second electrode of the quartz crystal oscillator; a detector circuit which receives the output from the differential amplifier circuit and using the output from the oscillator circuit as detection signals; and an output amplifier circuit which receives the output from the detector circuit.

In a further embodiment of the present invention, the circuit for detection of angular velocity comprises a quartz crystal oscillator which is provided with a first electrode and a second electrode installed perpendicularly to the first electrode for driving the oscillator; a third electrode installed on the same plane as the oscillator as a part of the second electrode for taking out an electric field generated by rotation the oscillator; an oscillator circuit having an inverting amplifier with the input terminal connected to the first electrode and the output terminal connected to the second electrode of the quartz crystal oscillator; a differential amplifier circuit with the input terminal connected to the third electrode of the quartz crystal oscillator; a detector circuit which receives the output from the differential amplifier circuit and using the output from the oscillator circuit as detection signals; and an output amplifier circuit which receives the output from the detector circuit.

In a still further embodiment of the present invention, the circuit for detection of angular velocity comprises a quartz crystal oscillator which is provided with a first electrode and a second electrode installed perpendicularly to the first electrode for driving the oscillator; a third electrode connected to the second electrode, a fourth electrode installed on the opposite plane of the third electrode, a fifth electrode installed on the same plane as the oscillator as the third electrode, and a sixth electrode installed on the same plane as the oscillator as the fourth electrode, for taking out an electric field generated by rotation, the oscillator; an oscillator circuit having an inverting amplifier with the input terminal connected to the first electrode and the output terminal connected to the second electrode of the quartz crystal oscillator; a differential amplifier circuit having the input terminal connected to the fifth and sixth electrode of the quartz crystal oscillator; a detector circuit which receives the output from the differential amplifier circuit and using the output from the oscillator circuit as detection signals; and an output amplifier circuit which receives the output from the detector circuit.

Further, a circuit for detection of angular velocity is provided according to the present invention, which comprises a quartz crystal oscillator which is provided with a first electrode and a second electrode installed perpendicularly to the first electrode for driving the oscillator; a third electrode connected to the second electrode, and a fourth electrode and a fifth electrode installed on the opposite plane of the third electrode, for taking out an electric field generated by rotation the oscillator; an oscillator circuit having an inverting amplifier with the input terminal connected to the first electrode and the output terminal connected to the second electrode of the quartz crystal oscillator; a differential amplifier circuit having the input terminal connected to the fourth and fifth electrodes of the crystal oscillator; a detector circuit which receives the output from the differential amplifier circuit and using the output from the oscillator circuit as detection signals; and an output amplifier circuit which receives the output from the detector circuit.

Still further, a circuit for detection of angular velocity is provided according to the present invention, which comprises a quartz crystal oscillator which is provided with a first electrode and a second electrode installed perpendicularly to the first electrode for driving the oscillator; a third electrode connected to the second electrode, a fourth electrode installed perpendicularly to the third electrode, and a fifth electrode installed on the opposite plane of the fourth electrode, for taking out an electric field generated by rotation the oscillator, an oscillator circuit having an inverted amplifier with the input terminal connected to the first electrode and the output terminal connected to the second electrode of the quartz crystal oscillator; a differential amplifier circuit having the input terminal connected to the fourth and fifth electrodes of the quartz crystal oscillator; a detector circuit which receives the output from the differential amplifier circuit and using the output from the oscillator circuit as detection signals; and an output amplifier circuit which receives the output from the detector circuit.

Because the oscillator circuit of the present invention has the above-mentioned construction with the quartz crystal oscillator and the inverting amplifier, in the case of the quartz crystal oscillator vibrating at a frequency in the neighborhood of 32 KHz, the return circuit has an amplification factor $|\beta|$ of about 0.2–0.9 and a phase lag $\theta_2$ of about 180°. The similar conditions can be achieved by the suitable selection of frequency even from a high frequency range. On the other hand, because of the fact that the amplification factor of an inverting amplifier is generally 20–30 db or higher and further that a phase rotation of a typical inverting amplifier is almost 180° at a frequency of about 30 KHz, the vibration conditions of formulas (1) and (2) can be satisfied.

Therefore, the circuit for detection of angular velocity of the present invention requires no phase shift circuit for the return section of the oscillator circuit and can thus perform highly stable vibrations without reduction in the transmission rate and variations in the phase lag due to characteristic changes in a phase shift circuit. Further, detection output is superimposed to the vibration output to stabilize the operation of the differential amplifier circuit. This prevents drift from being generated in the detector circuit output, thus remarkably increasing the measurement accuracy. The circuit construction is simplified and adaptable to mass production.

BEST MODE FOR CARRYING OUT THE INVENTION

Embodiments of the present invention will be illustrated by reference to the drawings.

Figure 1:
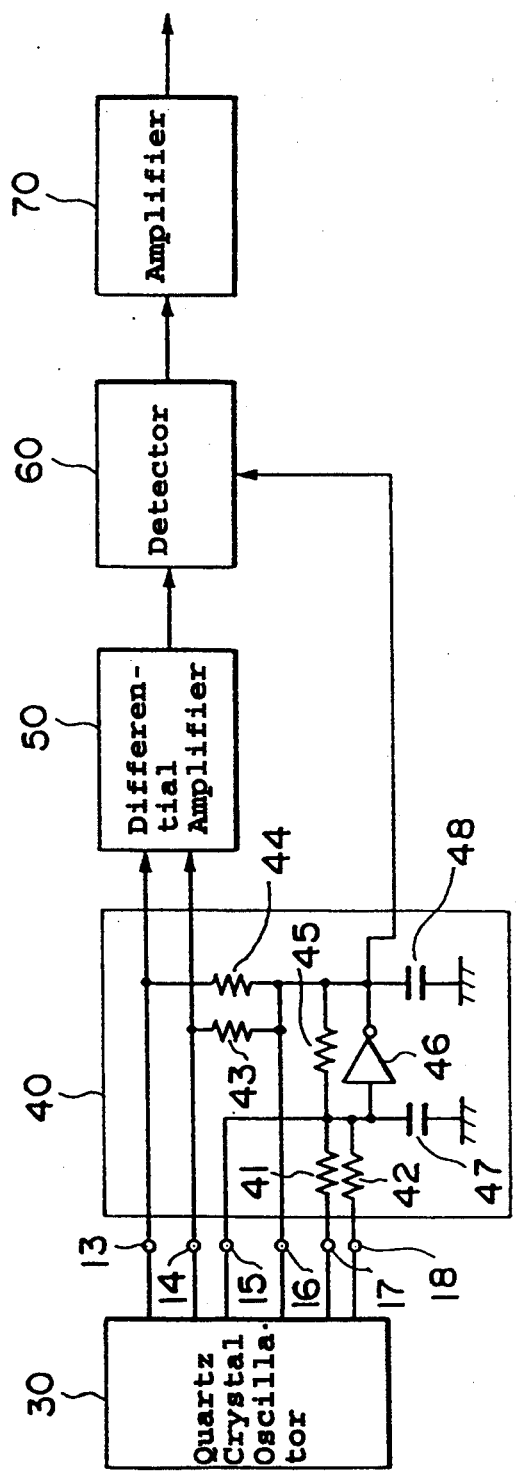
FIG. 1 is a drawing showing the detector circuit for the first embodiment of the present invention.
Figure 2:
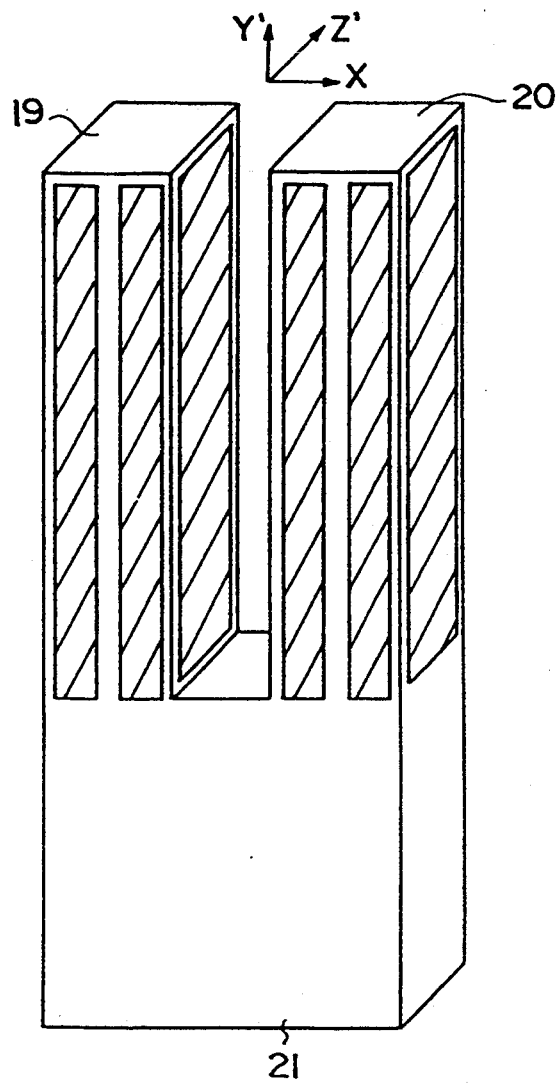
FIG. 2 is a perspective view of the quartz crystal oscillator in the first embodiment of the present invention.
Figure 3:
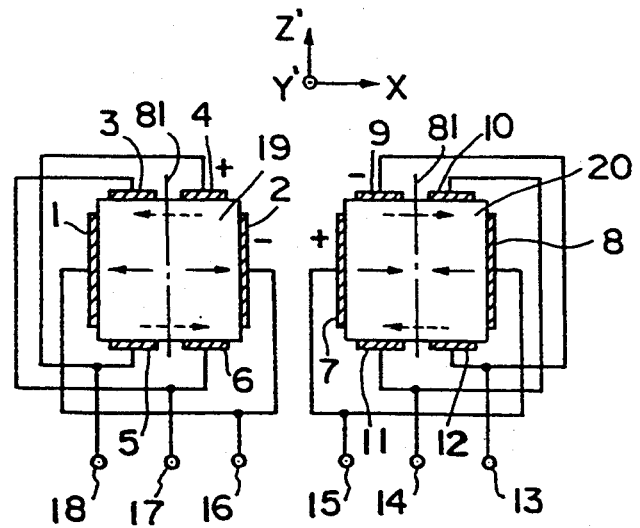
FIG. 3 is a cross-sectional view of the electrode for the quartz crystal oscillator in the first embodiment of the present invention.

FIG. 1 is a drawing showing the detector circuit for the first embodiment of the present invention, FIG. 2 is a perspective view of the quartz crystal oscillator in the first embodiment, and FIG. 3 is a cross-sectional view showing the arrangement and mutual connection among electrodes for the oscillator.

The quartz crystal oscillator shown in FIG. 2 is a so-called X-cut quartz crystal oscillator, in which the quartz crystal is cut at XY' plane having Y axis (mechanical axis) Y' axis produced by rotating XY plane by 0°–10° with respect to X axis (electric axis), so as to arrange electrodes such that expansion to the direction of the Y' axis is allowed to occur at both sides of the neutral plane 81 (FIG. 3) of vibration. Here, the Z' axis is a Z axis (optical axis) crossing the Y' axis at right angle. The quartz crystal oscillator is of a tuning-fork-type consisting of branch sections 19, 20 and a base section 21. These are integrally formed from one quartz plate by a photoengraving and etching process or by a wire-saw technique.

As shown in FIG. 3, electrode 1 is provided on one of the planes parallel to the Y'Z' plane of one of the branches (19) of the tuning fork, and electrode 2 is provided on the opposite plane. Further, electrode 7 is provided on one of the planes parallel to the Y'Z' plane of the other branch 20 of the tuning fork, and electrode 8 is provided on the opposite plane. Electrodes 1 and 2, and electrodes 7 and 8 are connected to each other within the quartz crystal oscillator, and terminals 16 and 15 are provided, respectively. Electrodes 3 and 4 are provided on one of the planes parallel to the XY' plane of branch 19, and electrodes 5 and 6 are provided on the opposite plane. Electrodes 9 and 10 are provided on one of the planes parallel to the XY' plane of branch 20, and electrodes 11 and 12 are provided on the opposite plane. Then, electrodes 3 and 6, electrodes 4 and 5, electrodes 9 and 12, and electrodes 10 and 11 are connected to each other within the quartz crystal oscillator, and terminals 17, 18, 13 and 14 are provided, respectively. These electrodes 1–12 are formed by vacuum deposition of a metal film, such as chromium and gold.

As shown in FIG. 1, terminals 13 to 18 of the quartz crystal oscillator 30 are connected to oscillator circuit 40. Specifically, terminals 13 and 14 are connected to output of invertor 46, which is an inverting amplifier constructed by a CMOS transistor (complementary field effect transistor), via resistors 44 and 43 of oscillator circuit 40, and terminal 15 is connected to the input of invertor 46. Terminal 16 is connected to the output of invertor 46. Further, terminals 17, and 18 are connected to the input of invertor 46 via resistors 41 and 42. These resistors 41 and 42 may be provided as thin film resistors, for example, on the base 21 of the quartz crystal oscillator shown FIG. 2. Although an invertor consisting of a CMOS transistor is given here as an example of the inverting amplifier, any amplifiers with a high input resistance can be used. Resistor 45 is a feedback resistor (Rf), and condensers 47 and 48 are respectively an input capacity (Cin) and an output capacity (Cout). These form a feedback circuit together with the quartz crystal oscillator 30.

This construction satisfies the above-described conditions of formulas (1) and (2), so that when voltage is applied an electric field is created to the direction of the arrow shown by a solid line in FIG. 3, and the oscillator circuit begins to vibrate and immediately reaches a steady state. Self-oscillation then occurs at a specific resonance frequency to the X axis direction of FIG. 2.

When a rotation force at an angular velocity of $\omega$ is applied around the Y' axis of the quartz crystal oscillator, Corioli's force Fc is created on the both branch sections 19 and 20 of the tuning fork to the directions opposite to each other in a plane parallel to the Y'Z' plane.

The Corioli's force Fc applied to one of the branches is expressed by the following formula (4), $$Fc = 2m\omega v = 2m\omega \cdot a \cdot \sin \omega_0 1 \qquad (4),$$

wherein $$v = a \cdot \sin \omega_0 t \qquad (3),$$

a is a velocity amplitude of vibration, $\omega_o$ is an angular frequency of vibration, and m is the mass of the vibrating portion.

The Corioli's force created by angular velocity $\omega$ deforms the branched section of the oscillator, and an electric field is generated to the direction of the arrow shown in a broken line in FIG. 3. This creates a detection output at terminals 13 and 14, which is then applied to the input of differential amplifier circuit 50, superimposing to the output of oscillator circuit 40 in FIG. 1. The output of oscillation circuit 40 is deducted from the output of the differential amplifier circuit 50, and the value thus obtained entirely depends on the field generated by angular velocity $\omega$.

The phase of the output voltage of differential amplifier circuit 50 and that of oscillator circuit 40 must be the same. In the detector circuit of this embodiment, the differential amplifier circuit 50 also acts as a phase shift circuit, so that the phase of the output voltage of differential amplifier circuit 50 and that of oscillator circuit 40 are identical. If necessary, a phase shift circuit may be provided after the differential amplifier circuit 50 or the oscillator circuit 40.

Because the output voltage of the oscillator circuit applied to the input terminal of differential amplifier circuit 50, superimposing to the detection output, is large enough for differential amplifier circuit 50 to be actuated stably, drift created in the output is very small. The output of differential amplifier circuit 50 is connected to the input terminal of detector circuit 60, and detection is performed as the output of oscillator circuit 40 as detection signals. The output of detector circuit 60 is connected to the input terminal of output amplifier circuit 70 which contains a smoothing circuit. The rotation angular velocity of the amplifier circuit 70 is d.c. voltage, based on which value the rotations angular velocity can be known, and thus the system can act as an angular velocity detector (a gyroscope).

An embodiment of the second invention will be illustrated by reference to the drawings.

Figure 4:
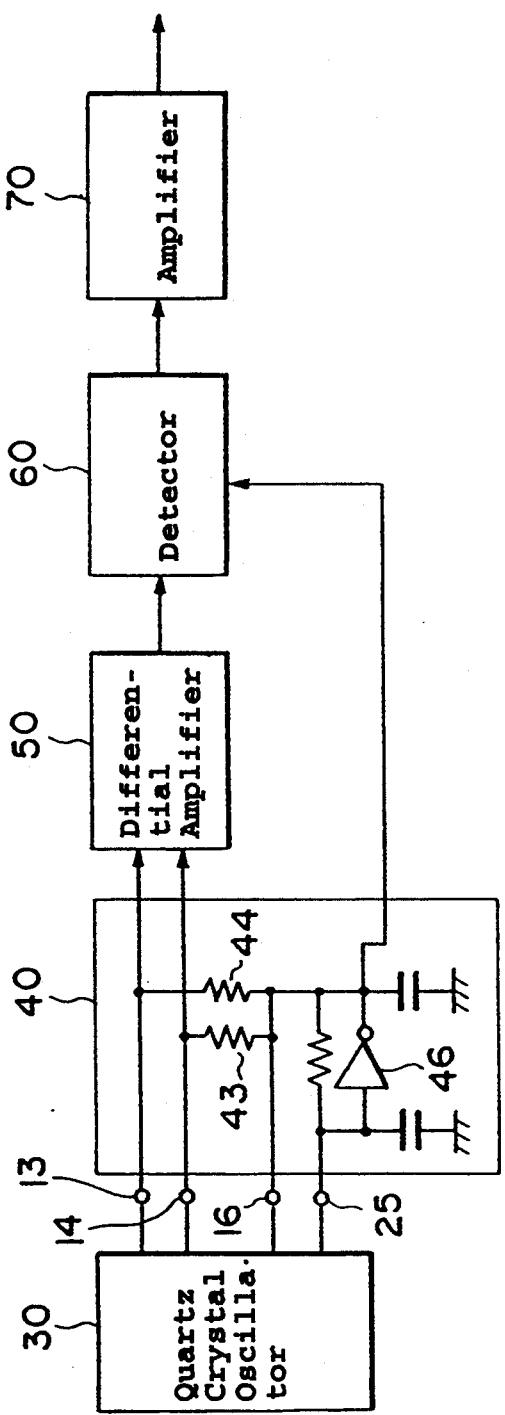
FIG. 4 is a drawing showing the detector circuit for the second embodiment of the present invention.
Figure 5:
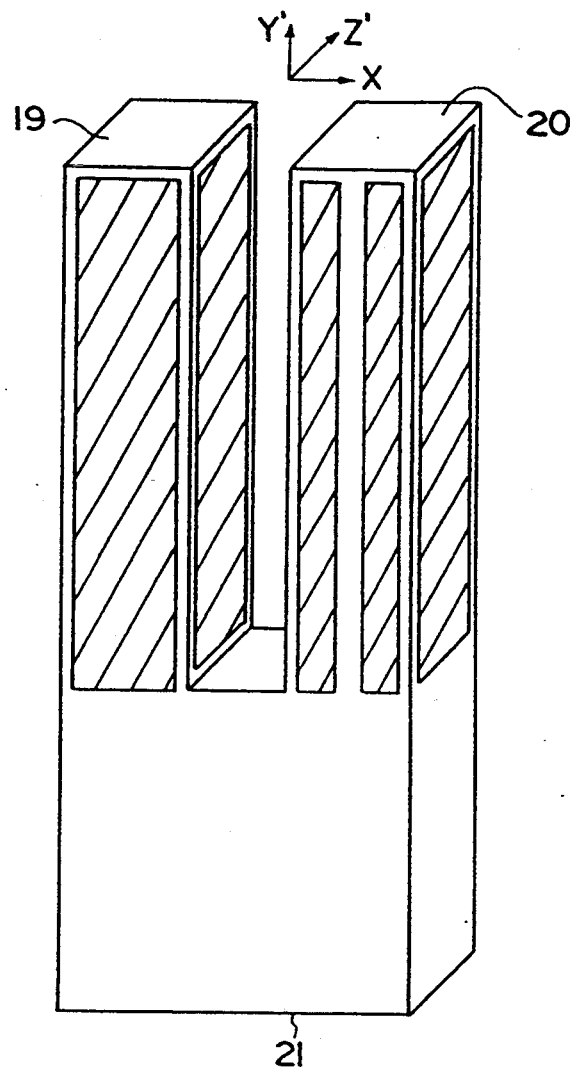
FIG. 5 is a perspective view of the quartz crystal oscillator in the second embodiment of the present invention.
Figure 6:
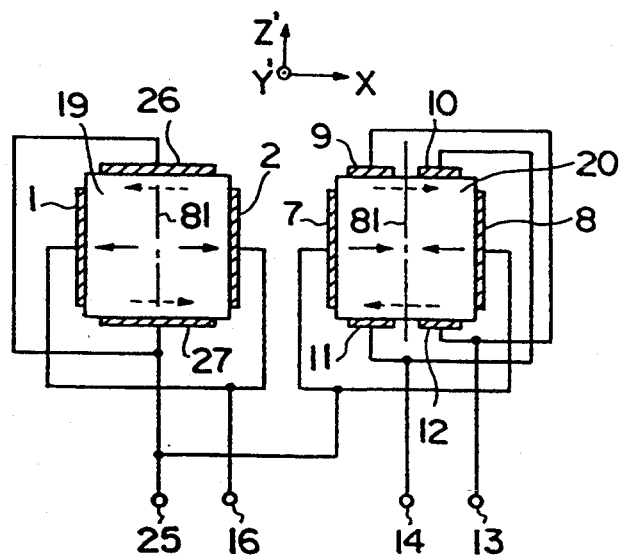
FIG. 6 is a cross-sectional view of the electrode for the quartz crystal oscillator in the second embodiment of the present invention.

FIG. 4 is a drawing showing the detector circuit for the second embodiment, FIG. 5 is a perspective view of the quartz crystal oscillator in the second embodiment, and FIG. 6 is a cross-sectional view showing the arrangement and mutual connection among electrodes for the oscillator.

The quartz crystal oscillator shown in FIG. 5 is an X-cut quartz crystal oscillator, the same as in the first embodiment, and consists of branched sections 19, 20 and base 21. The branched sections 19, 20 form electrodes. As shown in FIG. 6, electrode 1 is provided on one of the planes parallel to the Y"Z' plane of one of the branches (19) of the tuning fork, and electrode 2 is provided on the opposite plane. Further, electrode 26 is provided on one of the planes parallel to the XY' plane and electrode 27 is provided on the opposite plane. On another branch 20 electrodes 7, 8, 9, 10, 11 and 12 are provided in the same manner as in the first embodiment, shown in FIG. 3. Electrodes 1 and 2, electrodes 26 and 27, and electrodes 7 and 8 are connected to each other within the quartz crystal oscillator, and terminals 16 and 25 are provided, respectively. Further, in the same manner as the in first embodiment, terminal 13 connected to electrodes 9 and 12, and terminal 13 connected to electrodes 10 and 11 are provided.

As shown in FIG. 4, terminals 13, 14, 16 and 25 of the quartz crystal oscillator 30 are connected to oscillator circuit 40. Specifically, terminals 13 and 14 are connected to the output of invertor 46 via resistors 43 and 44 of oscillator circuit 40, and terminals 25 is connected to the input of invertor 46. This construction enables a driving voltage created by oscillator circuit 40 to be applied solely to the branch section 19 of the quartz crystal oscillator in FIG. 5, thus ensuring high vibration stability.

Further, in FIG. 4, terminals 13 and 14 of quartz crystal oscillator 30 are connected to differential amplifier circuit 50. The construction and operation of the differential amplifier circuit 50, detector circuit 60, and output amplifier circuit 70 are the same as discussed for the first embodiment.

An embodiment of the third invention will be illustrated by reference to the drawings.

Figure 7:
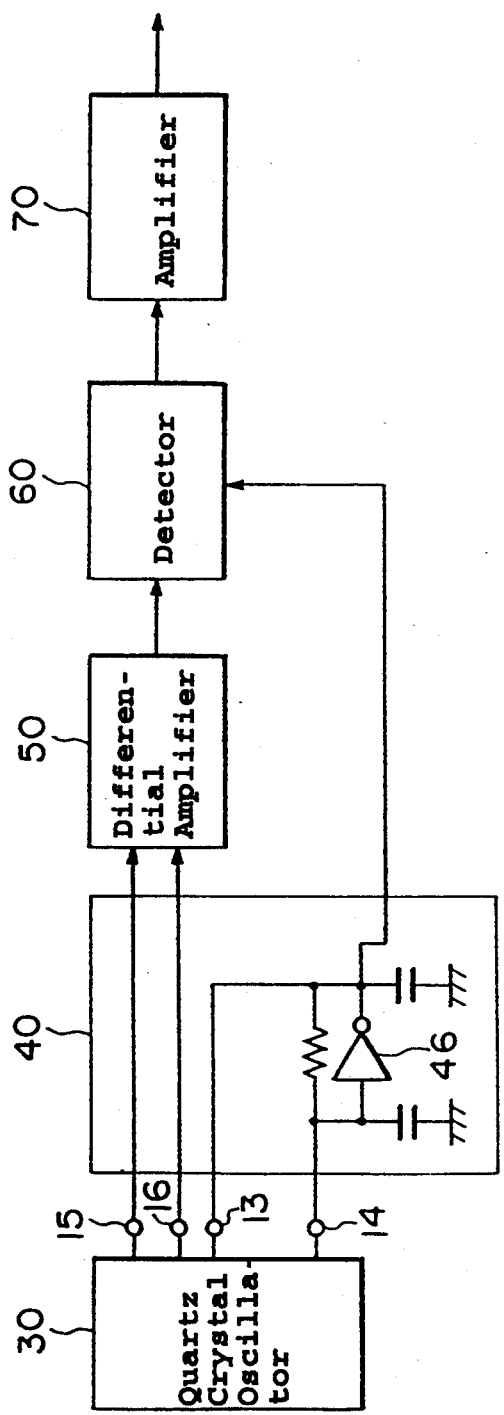
FIG. 7 is a drawing showing the detector circuit for the third embodiment of the present invention.
Figure 8:
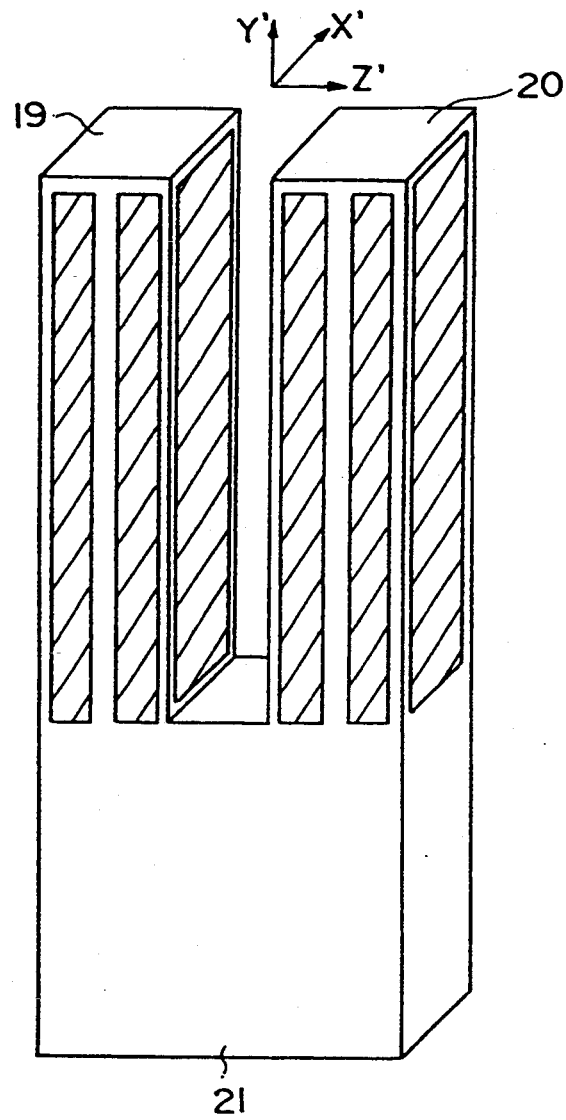
FIG. 8 is a perspective view of the quartz crystal oscillator in the third embodiment of the present invention.
Figure 9:
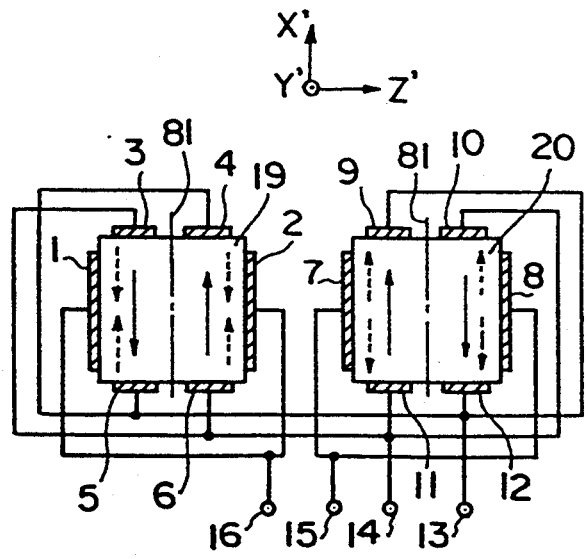
FIG. 9 is a cross-sectional view of the electrode for the quartz crystal oscillator in the third embodiment of the present invention.

FIG. 7 is a drawing showing the detector circuit for the third embodiment, FIG. 8 is a perspective view of the oscillator in the third embodiment, and FIG. 9 is a cross-sectional view showing the arrangement and mutual connection among electrodes for the oscillator.

The quartz crystal oscillator shown in FIG. 8 is a so-called NT-cut quartz crystal oscillator, in which the quartz crystal is cut on the Z'Y' plane at X' axis, Y' axis, and Z' axis, each corresponding respectively to X axis (electric axis), Y axis, and Z axis, and produced by rotating the XY plane by 2°–10° and the YZ plane by 50°–60°, with respect to the X axis, so as to arrange electrodes such that expansion to the direction of the Z' axis is allowed to occur on the neutral plane of vibration 81. The quartz crystal oscillator consists of branch sections 19, 20 and base section 21. Electrodes are formed on these branched sections 19 and 20.

As shown in FIG. 9, electrode 1 is provided on one of the planes parallel to the X'Y' plane of one of the branches (19) of the tuning fork, and electrode 2 is provided on the opposite plane. Further, electrode 7 is provided on one of the planes parallel to the X'Y' plane of branch 20 of the tuning fork, and electrode 8 is provided on the opposite plane. Electrodes 1 and 2, and electrodes 7 and 8 are connected to each other within the quartz crystal oscillator, and terminals 16 and 15 are provided, respectively. Electrodes 3 and 4 are provided on one of the planes parallel to Z'Y' plane of branch 19, and electrodes 5 and 6 are provided on the opposite plane. Electrodes 9 and 10 are provided on one of the planes parallel to the Z'Y' plane of branch 20, and electrodes 11 and 12 are provided on the opposite plane. Then, electrodes 3 and 6, electrodes 10 and 11, electrodes 4 and 5, and electrodes 12 and 9 are connected to each other within the quartz crystal oscillator, and terminals 13 and 14 are provided, respectively.

As shown in FIG. 7, terminals 13 and 14 of the quartz crystal oscillator 30 are connected to oscillator circuit 40. Specifically, terminal 13 is connected to the output of invertor 46, and terminal 14 is connected to the input of invertor 46. Further, terminals 1, 5, and 16 are connected to the input of differential amplifier circuit 50.

When a rotation force with angular velocity ω is applied to around the Y' axis of the quartz crystal oscillator, a Corioli's force is created, which in turn produces an electric field shown by a broken line arrow in FIG. 9. Output 15 and output 16 thus produced are applied to the input terminal of differential amplifier circuit 50 shown in FIG. 7, superimposing to the output of oscillator circuit 40. The output of oscillator circuit 40 is subtracted by output of the differential amplifier circuit 50, and the value thus obtained entirely depends on the field generated by angular velocity ω. The construction and operation of the differential amplifier circuit 50, detector circuit 60, and output amplifier circuit 70 are the same as discussed for the previous embodiment.

An embodiment of the fourth invention will be illustrated by reference to the drawings.

Figure 10:
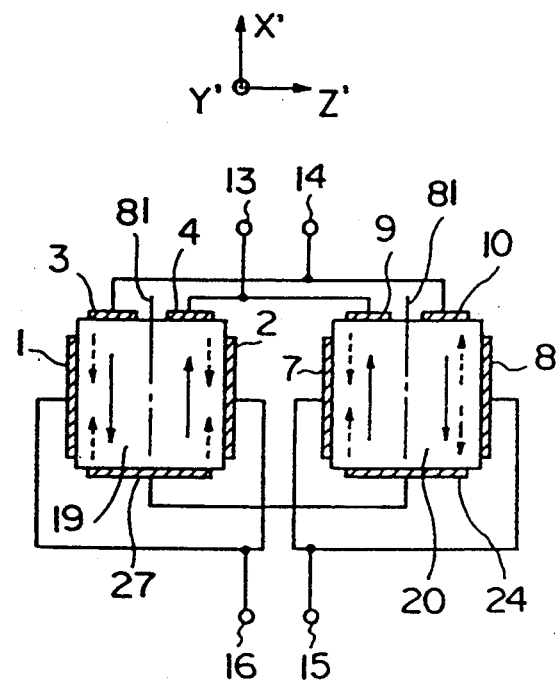
FIG. 10 is a cross-sectional view of the electrode for the quartz crystal oscillator in the fourth embodiment of the present invention.

FIG. 10 is across-sectional view of the arrangement and mutual connections of the electrode for the quartz crystal oscillator in the fourth embodiment of the present invention.

The quartz crystal oscillator in this embodiment is an NT-cut quartz crystal oscillator, the same as that of the third embodiment. As shown in FIG. 10, electrode 1 is provided on one of the planes parallel to X'Y' plane of one of the branches (19) of the tuning fork, and electrode 2 is provided on the opposite plane. Further, electrodes 7 is provided on one of the planes parallel to the X'Y' plane of branch 20 of the tuning fork, and electrode 8 is provided on the opposite plane. Electrodes 1 and 2, and electrodes 7 and 8 are connected to each other within the quartz crystal oscillator, and terminals 16 and 15 are provided, respectively. Further, electrodes 3 and 4 are provided on one of the planes parallel to the Z'Y' plane of the branch 19, and electrode 27 is provided on the opposite plane. Electrodes 9 and 10 are provided on one of the planes parallel to the Z'Y' plane of the branch 20, and electrode 24 is provided on the opposite plane. Electrodes 3 and 10, and electrodes 4 and 9 are connected to each other within the quartz crystal oscillator, and terminals 14 and 13 are provided, respectively. Electrodes 24 and 27 are connected to each other.

As shown in FIG. 7, terminals 13 and 14 of the quartz crystal oscillator 30 are connected to oscillator circuit 40. Specifically, terminals 13 is connected to the output of invertor 46, and terminals 14 is connected to the input of invertor 46. Further, terminals 15 and 16 are connected to the input of differential amplifier circuit 50. The construction and operation of the differential amplifier circuit 50, detector circuit 60, and output amplifier circuit 70 are the same as discussed for the previous embodiment.

An embodiment of the fifth invention will be illustrated by reference to the drawings.

Figure 11:
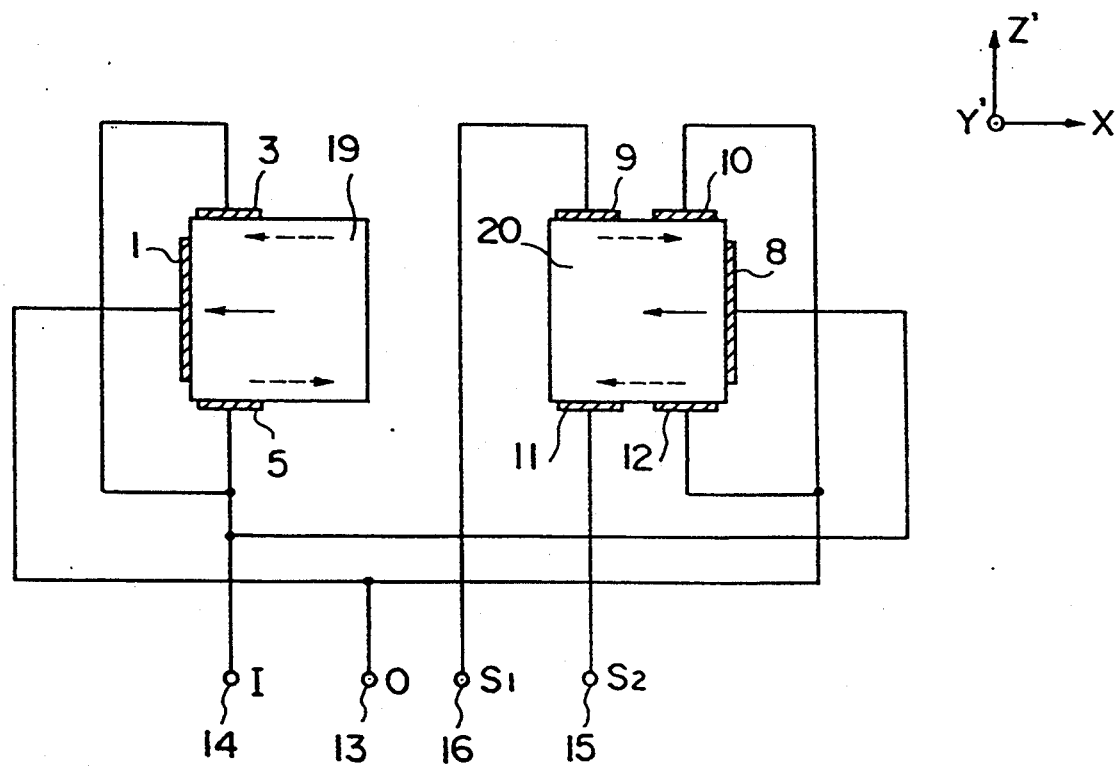
FIG. 11 is a cross-sectional view of the electrode for the quartz crystal oscillator in the fifth embodiment of the present invention.
Figure 12:
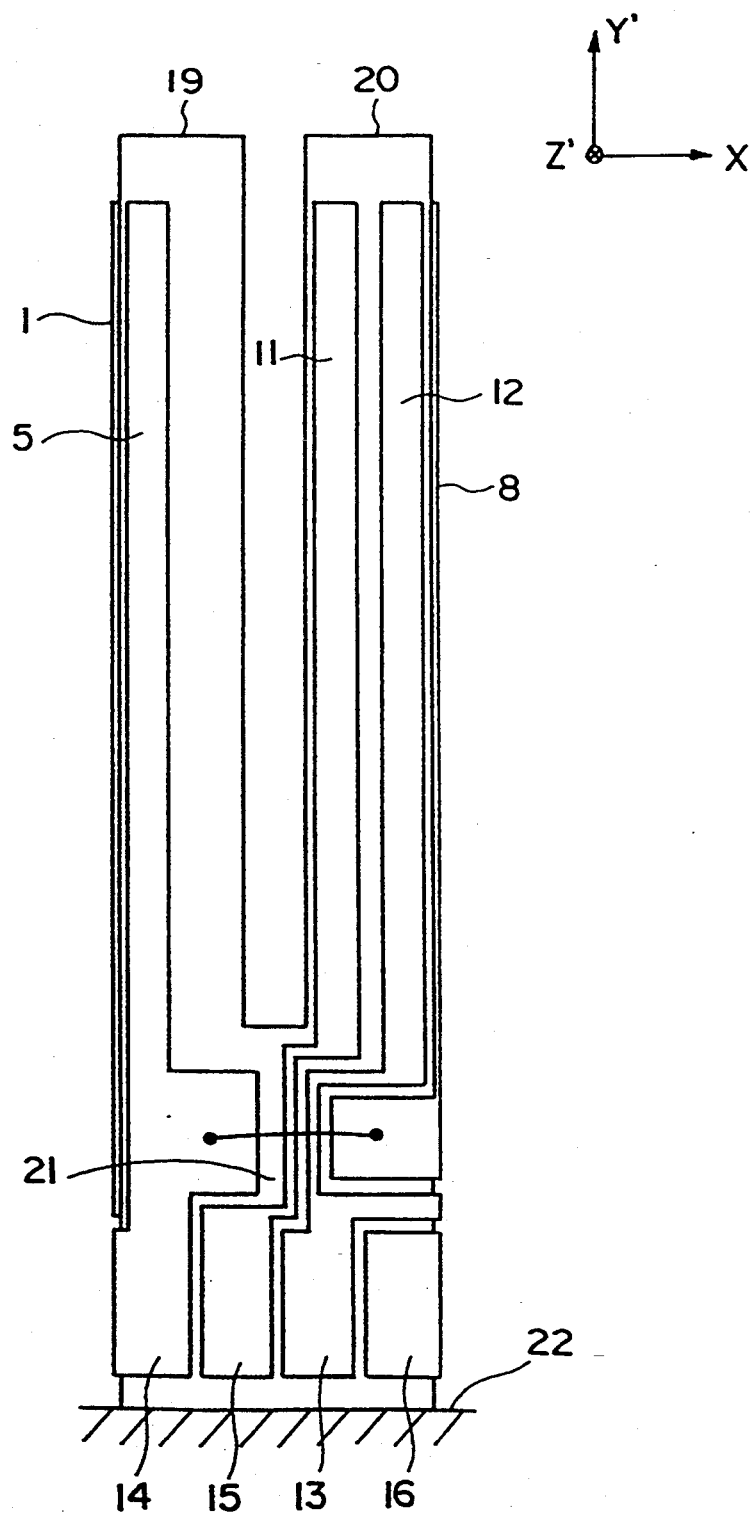
FIG. 12 is a front elevation of the quartz crystal oscillator in the fifth embodiment of the present invention.
Figure 13:
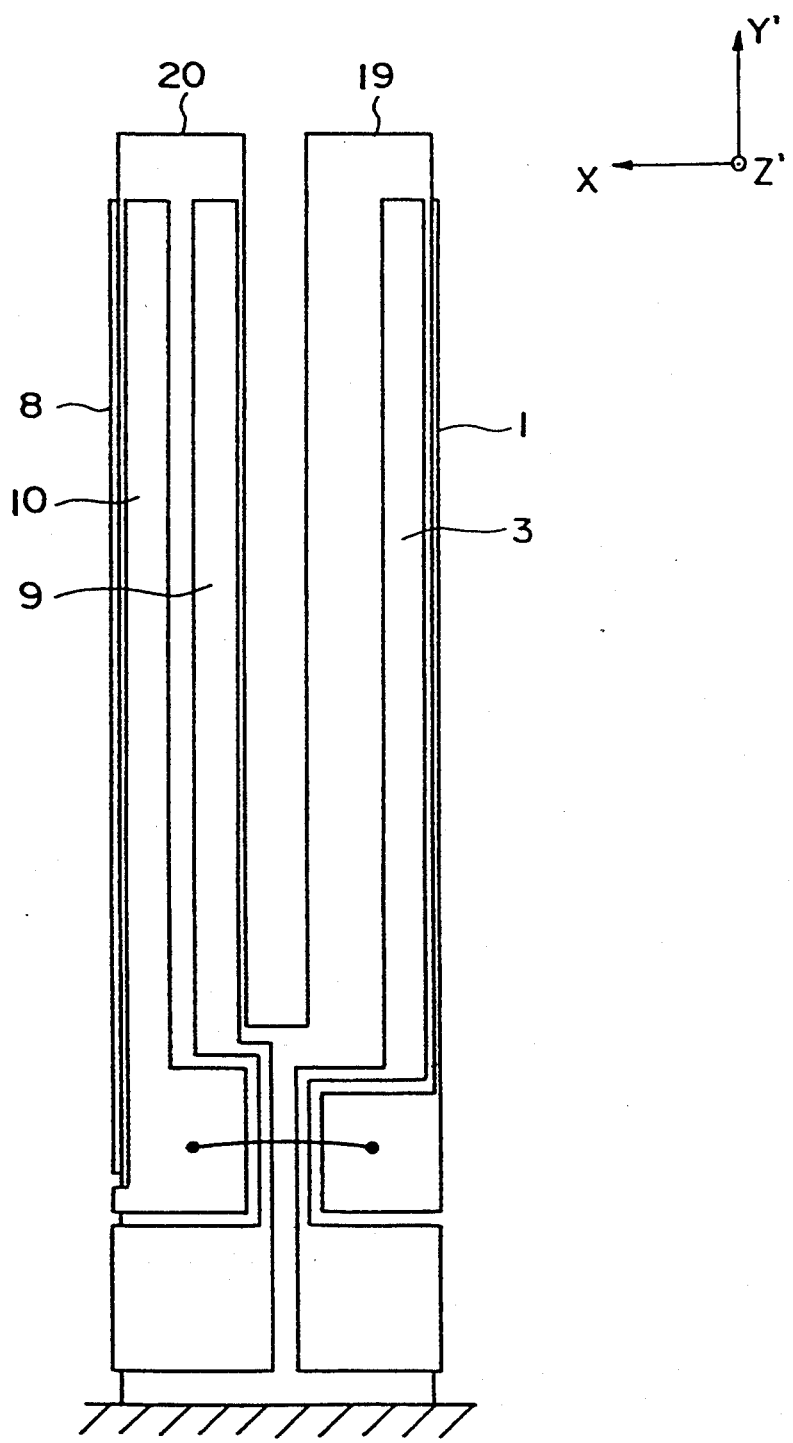
FIG. 13 is a rear elevation of the quartz crystal oscillator in the fifth embodiment of the present invention.

FIG. 11 is a cross-sectional view showing arrangement and mutual connection of the electrodes for the quartz crystal oscillator in the fifth embodiment, FIG. 12 and FIG. 13 are plan views showing arrangement of the electrodes for the quartz crystal oscillator, wherein FIG. 12 is a front elevation and FIG. 13 is a rear elevation of the quartz crystal oscillator.

The quartz crystal oscillator of this embodiment is an X-cut quartz crystal oscillator. As shown in FIG. 12, the quartz crystal oscillator consists of branched sections 19, 20 and base 21. The end of the base 21 is fixed by a member 22. The branched sections 19, 20, and the base 21 form electrodes as shown in FIGS. 12 and 13.

As shown in FIG. 11, electrode 1 is provided on one of the planes parallel to the Y'Z' plane of one of the branches (19) of the tuning fork, electrode 3 is provided on one of the planes parallel to the XY' plane, and electrode 5 is provided on the opposite plane. Further, electrode 8 is provided on the plane parallel to the Y'Z' of the other branch 20, electrodes 9 and 10 is provided on one of the planes parallel to the XY' plane, and electrodes 11 and 12 are provided on the opposite plane. Electrodes 1, 10 and 12, and electrodes 3, 5 and 8 are connected to each other within the quartz crystal oscillator, and terminals 13 and 14 are provided, respectively. These electrodes 1, 3, 5, 8, 10 and 12 are the electrodes driving the quartz crystal oscillator. Further, terminal 16 is provided to electrode 9, and terminal 15 is provided to electrode 11. These are electrodes for taking out the generated electric field.

As shown in FIG. 7, terminals 13 and 14 of the quartz crystal oscillator 30 are connected to oscillator circuit 40. Specifically, terminal 13 is connected to the output of invertor 46, and terminals 14 is connected to the input of invertor 46. Further, terminals 15 and 16 are connected to the input of differential amplifier circuit 50.

When a rotation force with angular velocity ω is applied to around the Y' axis of the quartz crystal oscillator, a Corioli's force is created, which in turn produces an electric field in branches 19 and 20 of the tuning fork shown by a broken line arrow in FIG. 11. Detection outputs are then created at terminals 15 and 16, superimposed to the output of oscillator circuit 30, and applied to the input terminal of differential amplifier circuit 50 of FIG. 7. Because the output of oscillator circuit 40 is subtracted by the output of the differential amplifier circuit 50, the value thus obtained entirely depends on the field generated by the angular velocity ω. The construction and operation of the differential amplifier circuit 50, detector circuit 60, and output amplifier circuit 70 are the same as discussed for previous embodiments.

An embodiment of the sixth invention will be illustrated by reference to the drawings.

Figure 14:
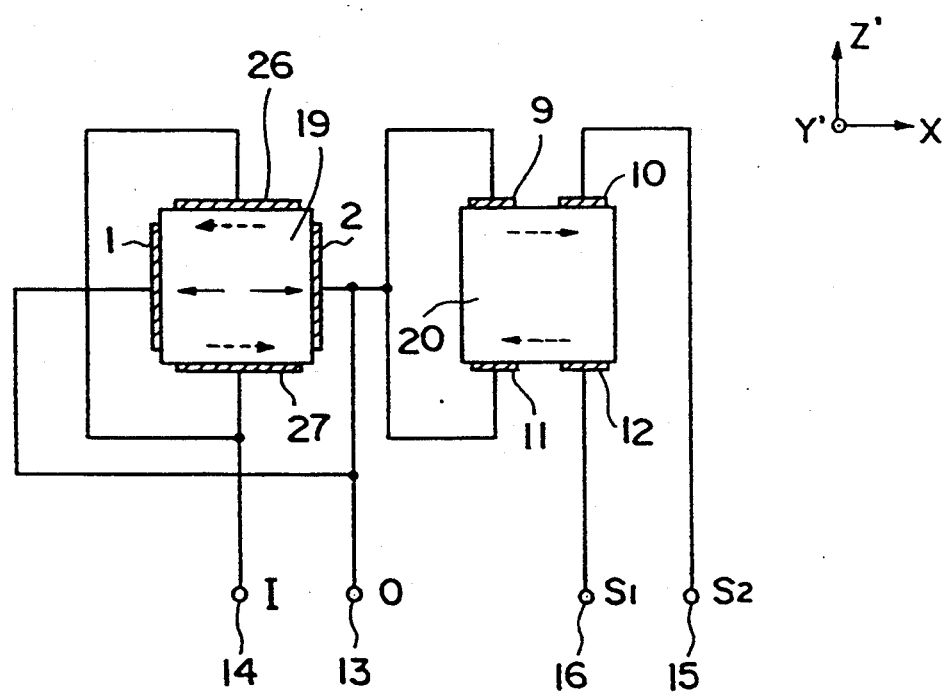
FIG. 14 is a cross-sectional view of the electrode for the quartz crystal oscillator in the sixth embodiment of the present invention.
Figure 15:
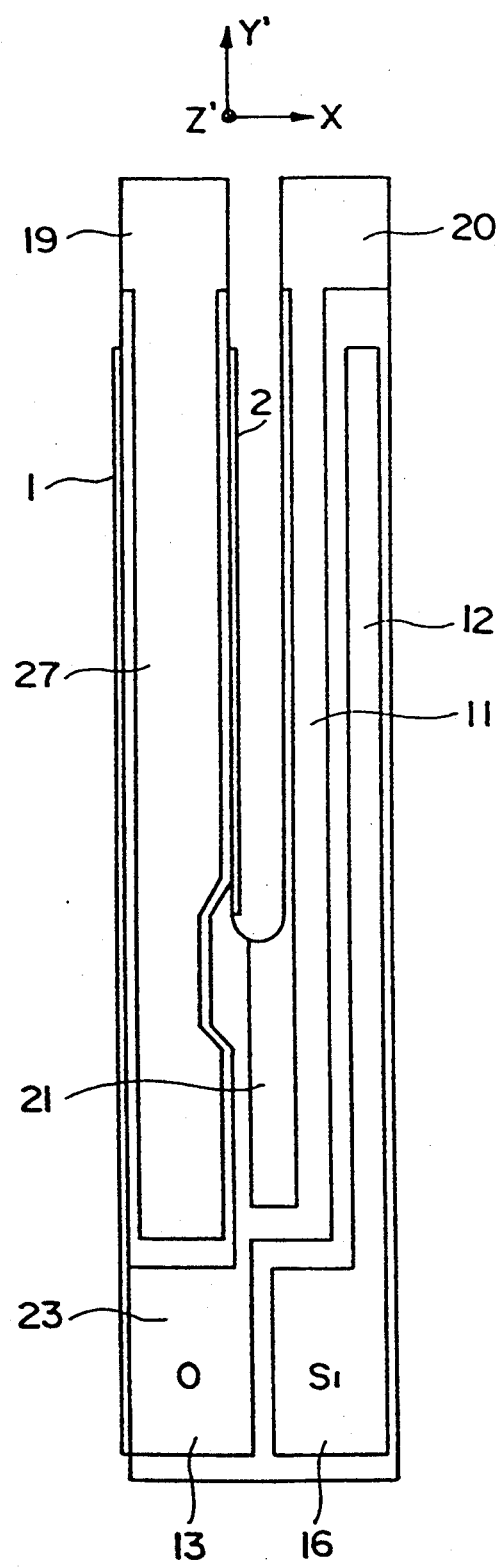
FIG. 15 is a front elevation of the quartz crystal oscillator in the sixth embodiment of the present invention.
Figure 16:
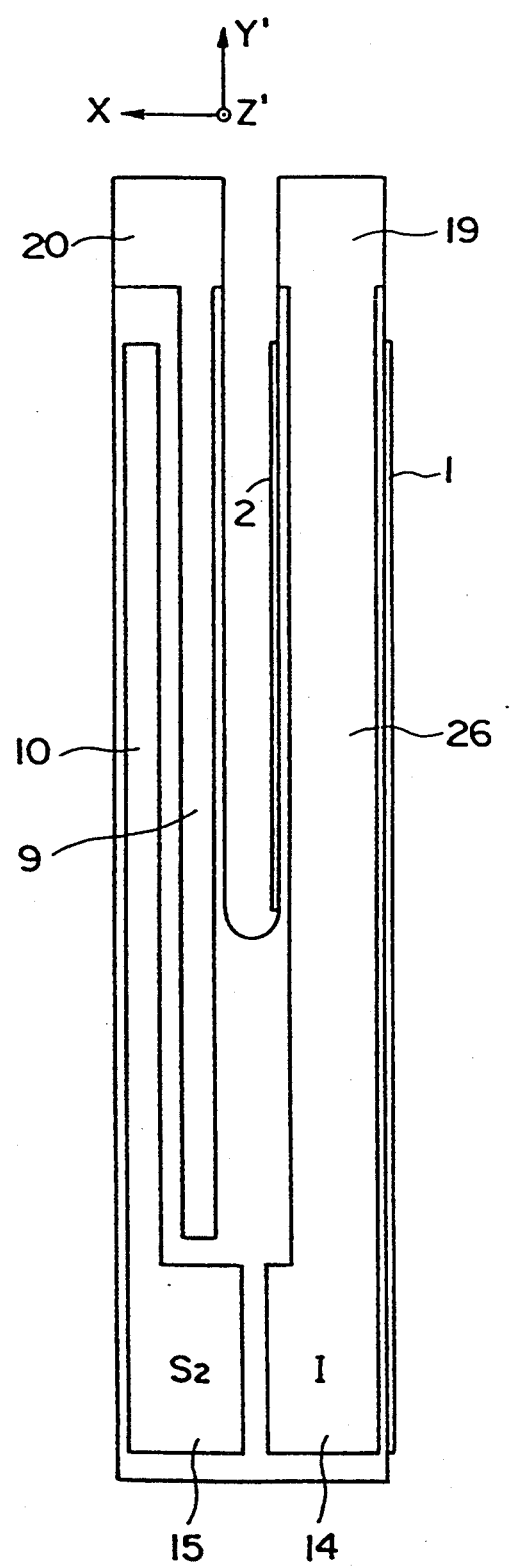
FIG. 16 is a rear elevation of the quartz crystal oscillator in the sixth embodiment of the present invention.

FIG. 14 is a cross-sectional view of the arrangement and mutual connections of the electrodes for the quartz crystal oscillator in the sixth embodiment of the present invention, FIG. 15 and FIG. 16 are plan views showing arrangement of the electrodes for the quartz crystal oscillator, wherein FIG. 15 is a front elevation and FIG. 16 is a rear elevation of the quartz crystal oscillator.

The quartz crystal oscillator of this embodiment is an X-cut quartz crystal oscillator. As shown in FIG. 15, the quartz crystal oscillator consists of branched sections 19, 20 and base 21. The end of the base 21 forms a fixed member 23, which forms a terminal for external connection. Electrodes are formed at branched sections 19, 20, and base 21 as shown in FIGS. 15 and 16.

As shown in FIG. 14, electrode 1 is provided on one of the planes parallel to the Y'Z' plane of one of the branches (19) of the tuning fork, and electrode 2 is provided on the opposite plane. Further, electrode 26 is provided on one of the planes parallel to the XY' plane, and electrode 27 is provided on the opposite plane. Electrodes 9 and 10 are provided on the plane parallel to the XY' plane of the other branch 20, and electrodes 11 and 12 are provided on the opposite plane. Electrodes 1 and 2, and electrodes 26 and 27 are connected to each other within the quartz crystal oscillator, and terminals 13 and 14 are provided, respectively. These electrodes 1, 2, 26 and 27 are the electrodes for driving the quartz crystal oscillator. Further, electrodes 9, 11, and 2 are connected to each other within the quartz crystal oscillator. As discussed below, terminal 13 connected to these electrodes 2, 9 and 11 are connected to the output of oscillator circuit in FIG. 7. Electrode 9 and electrode 11 therefore have the same potential as the output voltage of the oscillator circuit. Terminal 15 is provided to electrode 10, and terminal 16 is provided to electrode 12. These electrodes 10 and 12 are electrodes for taking out the electric field generated by rotation of the oscillator. Because electrodes 9 and 11 are of the same potential as the output of oscillator circuit 40, the output at electrodes 15 and 16 are the output of oscillator circuit 40, superimposed by the generated field. Arrangements obtained by rotating the electrodes on branched section 19 either right or left by 90° in FIG. 14 are also part of this embodiment.

As shown in FIG. 7, terminals 13 and 14 of the quartz crystal oscillator 30 are connected to oscillator circuit 40. Specifically, terminal 13 is connected to the output of invertor 46, and terminal 14 is connected to the input of invertor 46. Further, terminals 15 and 16 are connected to the input of differential amplifier circuit 50.

When a voltage is applied, an electric field is created to the direction of the arrow shown by a solid line in FIG. 14, and the oscillator circuit begins to vibrate and immediately reaches a steady state. Self-oscillation then occurs at a specific resonance frequency to the X axis direction of FIG. 15. When a rotation force with an angular velocity ω is applied to around the Y' axis of the quartz crystal oscillator, a Corioli's force is created, which in turn produces a field in tuning fork sections 19 and 20 as shown by a broken line arrow in FIG. 14. The detection output thus produced is applied to the input terminal of the differential amplifier circuit 50 shown in FIG. 7, superimposing to the output of oscillator circuit 40. Because the output of differential amplifier circuit 50 is subtracted by the output of oscillator circuit 40, this value is entirely dependent on the field generated by angular velocity ω. The construction and operation of the differential amplifier circuit 50, detector circuit 60, and output amplifier circuit 70 are the same as discussed for previous embodiments.

An embodiment of the seventh invention will be illustrated by reference to the drawings.

Figure 17:
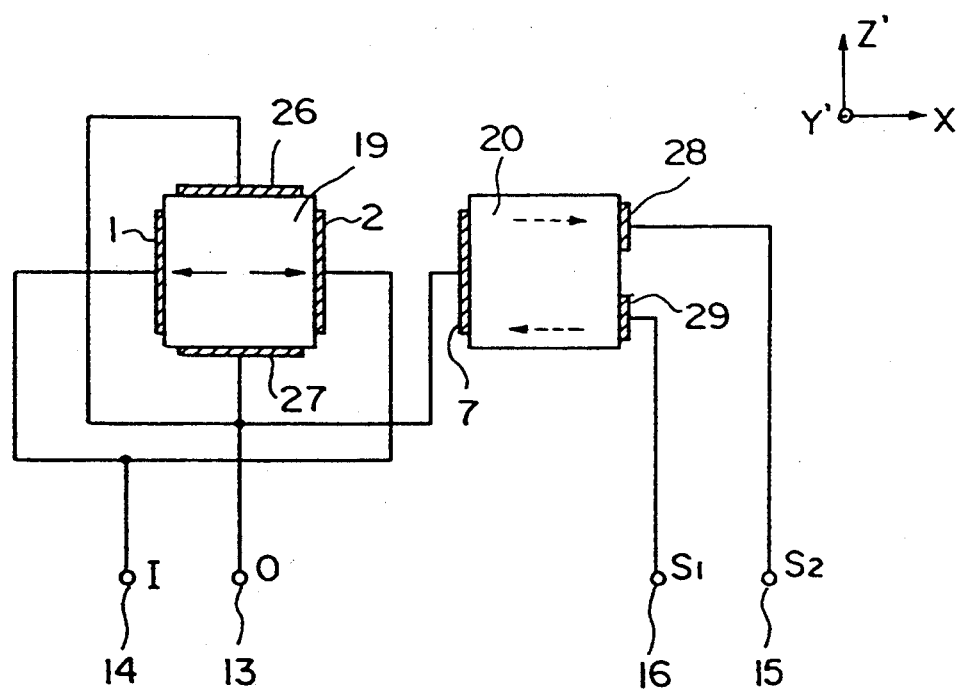
FIG. 17 is a cross-sectional view of the electrode for the quartz crystal oscillator in the seventh embodiment of the present invention.
Figure 18:
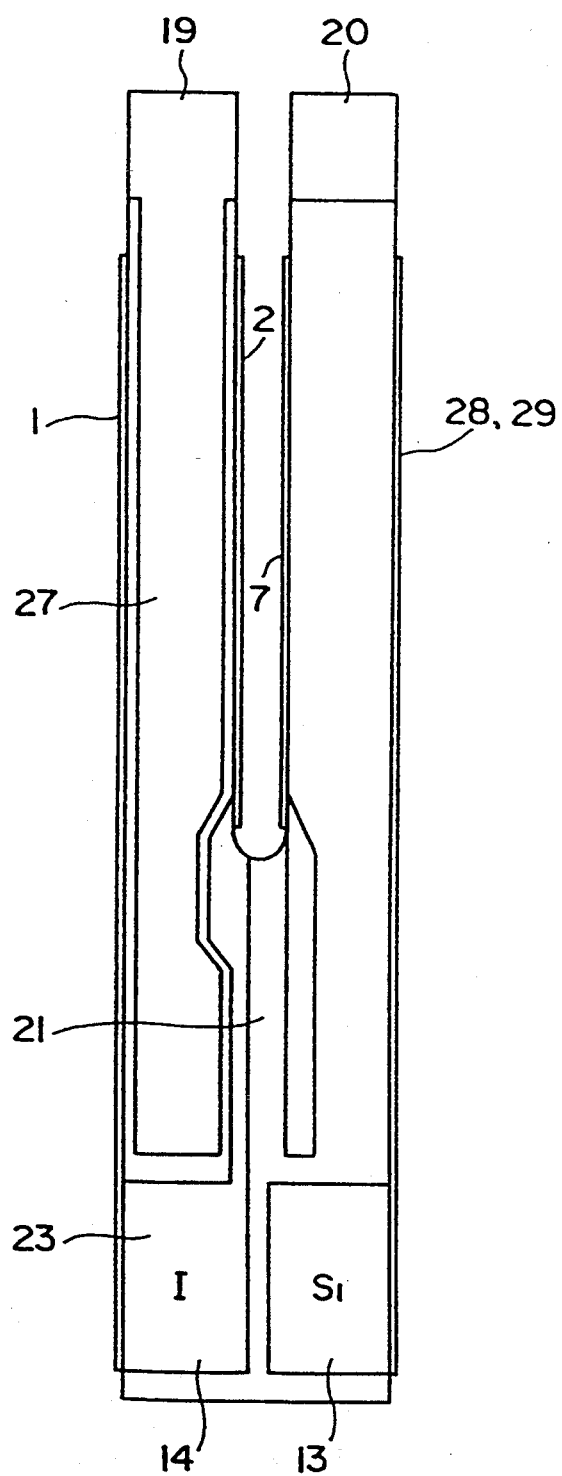
FIG. 18 is a front elevation of the quartz crystal oscillator in the seventh embodiment of the present invention.
Figure 19:
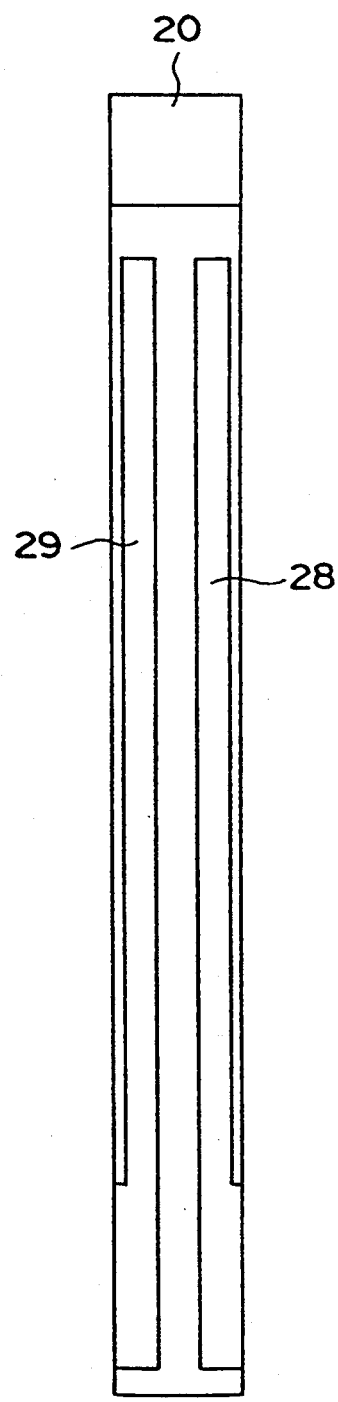
FIG. 19 is a side elevation of the quartz crystal oscillator in the seventh embodiment of the present invention.

FIG. 17 is a cross-sectional view of the arrangement and mutual connections of the electrodes for the quartz crystal oscillator in the seventh embodiment of the present invention, FIG. 18 and FIG. 19 are plan views showing arrangement of the electrodes for the quartz crystal oscillator, wherein FIG. 18 is a front elevation and FIG. 19 is a rear elevation of the quartz crystal oscillator.

Figure 20:
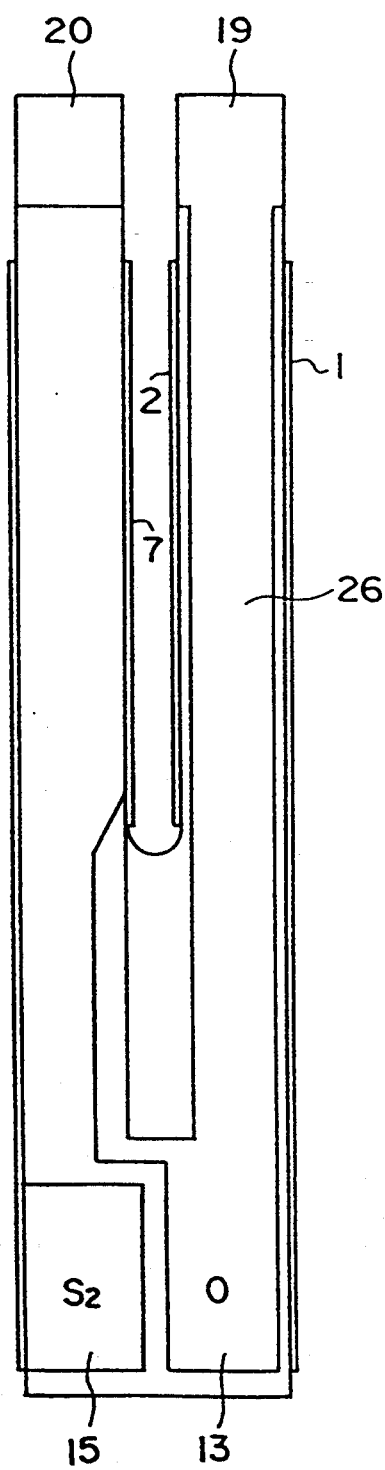
FIG. 20 is a rear elevation of the quartz crystal oscillator in the seventh embodiment of the present invention.

The quartz crystal oscillator of this embodiment is an X-cut quartz crystal oscillator. As shown in FIG. 18, the quartz crystal oscillator consists of branched sections 19, 20, a base 21, and a fixed member 23. Electrodes are formed on the branched sections 19, 20, and the base 21, as shown in FIGS. 18, 19 and 20.

As shown in FIG. 17, electrode 1 is provided on one of the planes parallel to the Y'Z' plane of one of the branches (19) off the tuning fork, and electrode 2 is provided on the opposite plane. Further, electrode 26 is provided on one of the planes parallel to the XY' plane, and electrode 27 is provided on the opposite plane. Electrode 7 is provided on the plane parallel to the Y'Z' plane of the other branch 20, and electrodes 28 and 29 are provided on the opposite plane. Electrodes 1 and 2, and electrodes 26 and 27 are connected to each other within the quartz crystal oscillator, and terminals 13 and 14 are provided, respectively. These electrodes 1, 2, 26 and 27 are the electrodes for driving the quartz crystal oscillator. Further, electrode 7 is connected to electrodes 26 and 27 As discussed below, terminal 13 connected to these electrodes 26, 27 and 7 is connected to the output of oscillator circuit 40 in FIG. 7. Electrode 7 therefore has the same potential as the output voltage of the oscillator circuit 40. Terminal 15 is provided to electrode 28, and terminal 16 is provided to electrode 29. These electrodes 28 and 29 are electrodes for taking out the electric field generated by rotation. Because electrode 7 is of the same potential as the output of oscillator circuit 40, output at terminals 15 and 16 is the output of oscillator circuit 30, superimposed by the generated field. Arrangements obtained by rotating the electrodes on branched section 19 either right or left by 90° in FIG. 17 are also part of this embodiment.

As shown in FIG. 7, terminals 13 and 14 of the quartz crystal oscillator 30 are connected to oscillator circuit 40. Specifically, terminal 13 is connected to the output of invertor 46, and terminal 14 is connected to the input of invertor 46. Further, terminals 15 and 16 are connected to the input of differential amplifier circuit 50. The construction and operation of the differential amplifier circuit 50, detector circuit 60, and output amplifier circuit 70 are the same as discussed for the previous embodiments.

An embodiment of the eighth invention will be illustrated by reference to the drawings.

Figure 21:
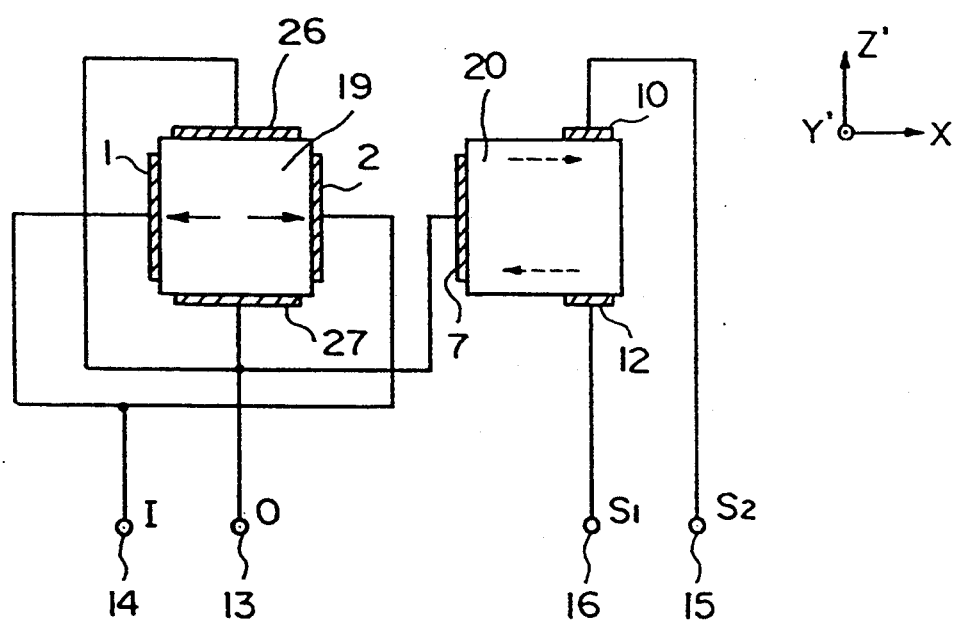
FIG. 21 is a cross-sectional view of the electrode for the quartz crystal oscillator in the eighth embodiment of the present invention.
Figure 22:
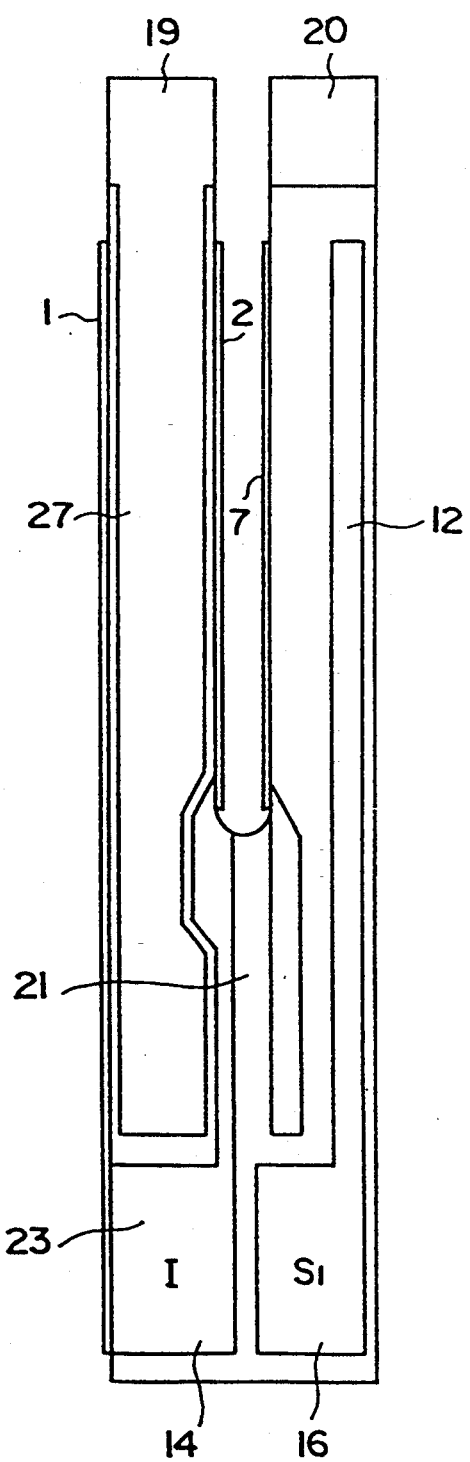
FIG. 22 is a front elevation of the quartz crystal oscillator in the eighth embodiment of the present invention.
Figure 23:
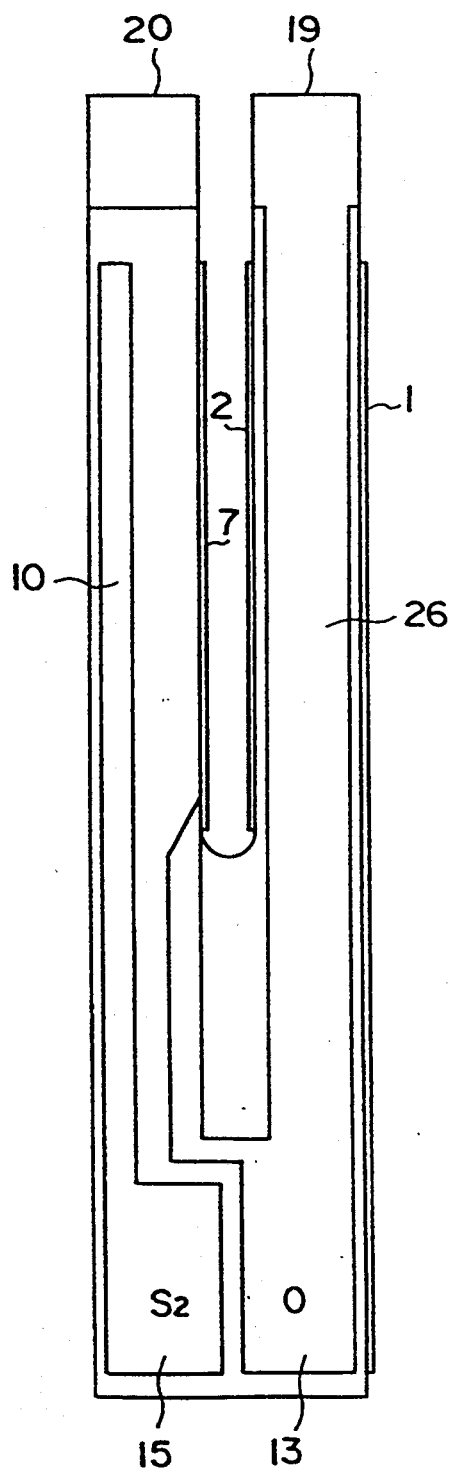
FIG. 23 is a rear elevation of the quartz crystal oscillator in the eighth embodiment of the present invention.

FIG. 21 is a cross-sectional view of the arrangement and mutual connections of the electrodes for the quartz crystal oscillator in the eighth embodiment, FIGS. 22 and 23 are plan views showing an arrangement of the electrodes for the quartz crystal oscillator, wherein FIG. 22 is a front elevation and FIG. 23 is a rear elevation of the quartz crystal oscillator.

The quartz crystal oscillator of this embodiment is an X-cut quartz crystal oscillator. As shown in FIG. 22, the quartz crystal oscillator consists of branched sections 19, 20, a base 21, and a fixed member 23. Electrodes are formed on the branched sections 19, 20, and the base 21, as shown in FIGS. 22 and 23.

As shown in FIG. 21, electrode 1 is provided on one of the planes parallel the to Y'Z' plane of one of the branches (19) of the tuning fork, and electrode 2 is provided on the opposite plane. Further, electrode 26 is provided on one of the planes parallel to XY' plane, and electrode 27 is provided on the opposite plane. Electrode 10 is provided on the plane parallel to the Y'Z' plane of the other branch 20, electrode 12 is provided on the opposite plane, and electrode 7 is further provided on the plane parallel to the Y'Z' plane. Electrodes 1 and 2, and electrodes 26 and 27 are connected to each other within the quartz crystal oscillator, and terminals 14 and 13 are provided, respectively. These electrodes 1, 2, 26 and 27 are the electrodes driving quartz crystal oscillator. Further, electrode 7 is connected to electrodes 26 and 27. As discussed later, terminal 13 connected to these electrodes 26, 27 and 7 is connected to the output of oscillator circuit 40 in FIG. 7. Electrode 7 therefore has the same potential as the output voltage of the oscillator circuit 40. Terminal 15 is provided to electrode 10, and terminal 16 is provided to electrode 12. These electrodes 10 and 12 are electrodes for taking out the electric field generated by rotation of the oscillator. Because electrode 7 is of the same potential as the output of oscillator circuit 40, the output at terminals 15 and 16 is the output of oscillator circuit 40, superimposed by the generated field. Arrangements obtained by rotating the electrodes on branched section 19 either right or left by 90° in FIG. 21 are also part of this embodiment.

As shown in FIG. 7, terminals 13 and 14 of the quartz crystal oscillator 30 are connected to oscillator circuit 40. Specifically, terminal 13 is connected to the output of invertor 46, and terminal 14 is connected to the input of invertor 46. Further, terminals 15 and 16 are connected to, the input of differential amplifier circuit 50. The construction and operation of the differential amplifier circuit 50, detector circuit 60, and output amplifier circuit 70 are the same as discussed for the previous embodiments.

Although embodiments comprising invertors consisting of CMOS transistors as inverting amplifiers are shown in the above-described examples, it is possible to use CMOS transistors for all other circuits.

Further, although quartz crystal oscillators with a vibration frequency about 32 KHz were given in the above embodiments, oscillators having a frequency of a higher range can also be used for these oscillator circuits with the same construction, if the frequency is suitably selected.

Although oscillators using quartz for substrates are given in the above embodiments, it is possible to use other materials possessing piezoelectric characteristics, such as lithium tantalate single crystals, lithium niobate single crystals, and lithium borate single crystals. The oscillators can be also produced by adhering or coating materials having piezoelectric characteristics to silicon substrate. Further, although tuning-fork-type oscillators were exemplified in the above descriptions, other tuning instruments which can produce bending vibration are also applicable to the present invention.

For the convenience of better understanding of the present invention, relationships between various embodiments given above and the subject matters in the claims are summarized as follows. The first and second embodiments are embodiments of claim 1; the third and fourth embodiments are those of claim 2; the fifth embodiment represents claim 3; the sixth embodiment, claim 4; the seventh embodiment, claim 5; and the eighth embodiment, claim 6. It should be understood that all embodiments are given for the purpose of illustration of the present invention and are not intended to be limiting thereof.

INDUSTRIAL APPLICABILITY OF THE INVENTION

As illustrated above, the circuits for detection of angular velocity of the present invention can be suitably used for inertia navigation of airplanes and ships. They are also suitable for use in small-type equipments, such as head-mount displays of virtual-reality-type, mouse for personal computers, hand-touch equipments of video cameras, and small-type robots.

I claim:

1. An angular velocity detector circuit comprising:
   a quartz crystal oscillator which is provided with a first electrode for driving the oscillator and a second electrode installed perpendicularly to the first electrode for taking out an electric field generated by rotation of the oscillator;
   an oscillator circuit having an inverting amplifier with an input terminal connected to the first electrode and an output terminal connected to the second electrode of the quartz crystal oscillator; a differential amplifier circuit with an input terminal connected to the second electrode of the quartz crystal oscillator;
   a detector circuit which receives an output from the differential amplifier circuit and using an output from the oscillator circuit as detection signals; and an output amplifier circuit which receives an output from the detector circuit.

2. An angular velocity detector circuit comprising:
   a quartz crystal oscillator which is provided with a first electrode installed on two parallel planes of the oscillator for driving the oscillator and a second electrode installed perpendicularly to the first electrode for taking out an electric field generated by rotation of the oscillator;
   an oscillator circuit having an inverting amplifier with an input terminal connected to a portion of the first electrode and an output terminal connected to another portion of the first electrode of the quartz crystal oscillator;
   a differential amplifier circuit with an input terminal connected to the second electrode of the quartz crystal oscillator;
   a detector circuit which receives an output from the differential amplifier circuit and using an output from the oscillator circuit as detection signals; and an output amplifier circuit which receives an output from the detector circuit.

3. An angular velocity detector circuit comprising:
   a quartz crystal oscillator which is provided with a first electrode and a second electrode installed perpendicularly to the first electrode for driving the oscillator, and a third electrode installed on the same plane of the oscillator as a part of the second electrode for taking out an electric field generated by rotation of the oscillator;
   an oscillator circuit having an inverting amplifier with an input terminal connected to the first electrode and an output terminal connected to the second electrode of the quartz crystal oscillator; a differential amplifier circuit with an input terminal connected to the third electrode of the quartz crystal oscillator;
   a detector circuit which receives an output from the differential amplifier circuit and using an output from the oscillator circuit as detection signals; and an output amplifier circuit which receives an output from the detector circuit.

4. An angular velocity detector circuit comprising:
   a quartz crystal oscillator which is provided with a first electrode and a second electrode installed perpendicularly to the first electrode for driving the oscillator;
   a third electrode connected to the second electrode, a fourth electrode installed on the opposite plane of the third electrode, a fifth electrode installed on the same plane of as the third electrode, and a sixth electrode installed on the same plane of as the fourth electrode, for taking out an electric field generated by rotation of the oscillator; an oscillator circuit having an inverting amplifier with an input terminal connected to the first electrode and an output terminal connected to the second electrode of the quartz crystal oscillator; a differential amplifier circuit having input terminal connected to the fifth and sixth electrodes of the quartz crystal oscillator;
   a detector circuit which receives an output from the differential amplifier circuit and using an output from the oscillator circuit as detection signals; and an output amplifier circuit which receives an output from the detector circuit.

5. An angular velocity detector circuit comprising:
   a quartz crystal oscillator which is provided with a first electrode and a second electrode installed perpendicularly to the first electrode for driving the oscillator;
   a third electrode connected to the second electrode, and a fourth electrode and a fifth electrode installed on the opposite plane of the third electrode, for taking out an electric field generated by rotation of the oscillator;
   an oscillator circuit having an inverting amplifier with an input terminal connected to the first electrode and an output terminal connected to the second electrode of the quartz crystal oscillator;

a differential amplifier circuit having input terminals connected to the fourth and fifth electrodes of the crystal oscillator;

a detector circuit which receives an output from the differential amplifier circuit and using an output from the oscillator circuit as detection signals; and an output amplifier circuit which receives an output from the detector circuit.

6. An angular velocity detector circuit comprising:

a quartz crystal oscillator which is provided with a first electrode and a second electrode installed perpendicularly to the first electrode for driving the oscillator;

a third electrode connected to the second electrode, and a fourth electrode installed perpendicularly to the third electrode, and a fifth electrode installed on the opposite plane of the fourth electrode, for taking out an electric field generated by rotation of the oscillator;

an oscillator circuit having an inverting amplifier with an input terminal connected to the first electrode and an output terminal connected to the second electrode of the quartz crystal oscillator; a differential amplifier circuit having input terminals connected to the fourth and fifth electrodes of the quartz crystal oscillator;

a detector circuit which receives an output from the differential amplifier circuit and using an output from the oscillator circuit as detection signals; and an output amplifier circuit which receives an output from the detector circuit.

* * * * *